Patented Feb. 1, 1927.

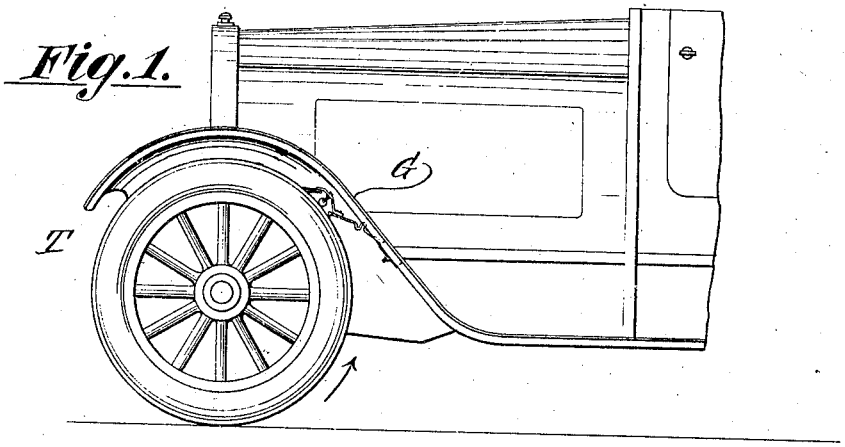
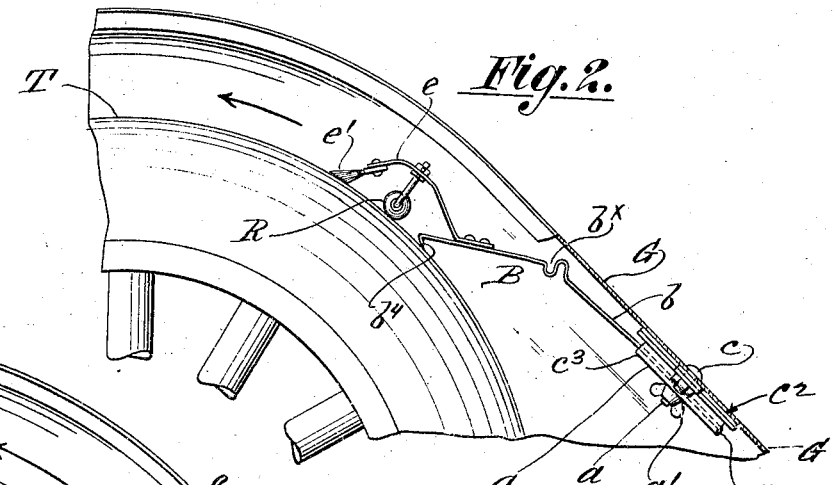
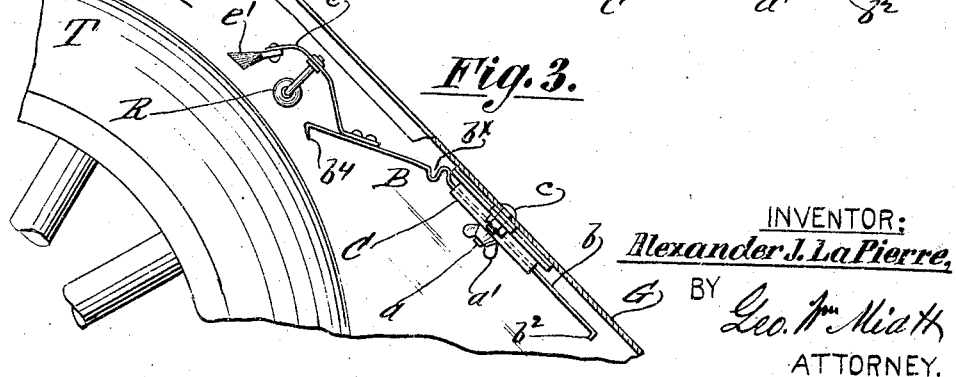

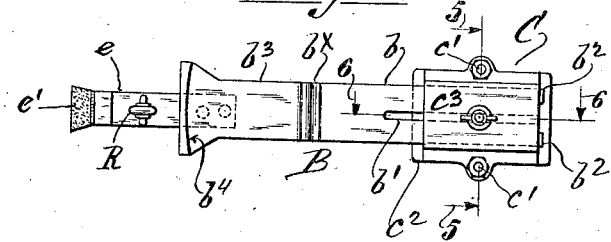
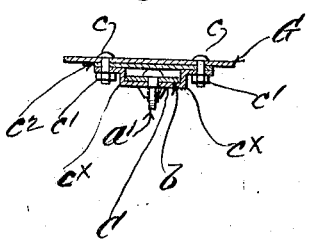
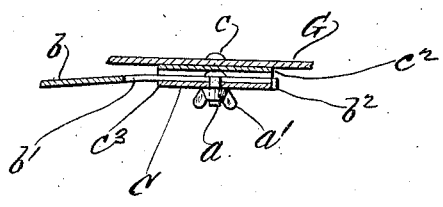
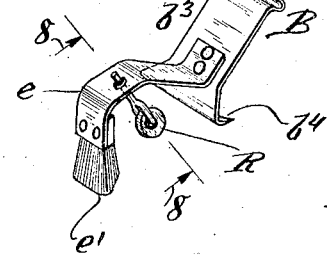
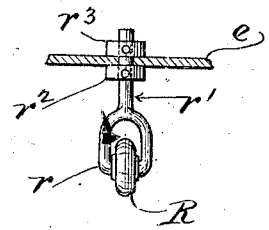
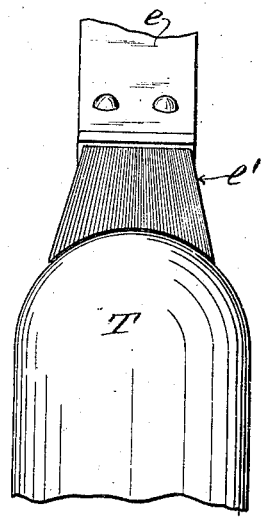

1,616,268

UNITED STATES PATENT OFFICE.

ALEXANDER J. LA PIERRE, OF NEW YORK, N. Y.

PNEUMATIC-TIRE-PROTECTIVE MEANS.

Application filed April 5, 1926. Serial No. 100,000.

My improvements relate more particularly to vehicles of the automobile class, the object of my invention being the protection of pneumatic tires by the automatic removal from the treads thereof of extraneous objects that might otherwise penetrate the treads and puncture the tires; and the invention consisting essentially in safeguarding and conserving the peripheral surfaces of the tire treads by cleaning means contacting therewith, and interposed between the treads and the mud guards of the vehicle, said cleaning means being mounted on the under sides of the mud guards and functioning as hereinafter fully set forth.

In the accompanying drawings I illustrate a practical embodiment of the essential features of my invention as adapted to a front wheel of an automobile, although I do not limit myself to the identical form and construction of the component parts of the tread protecting means and devices shown by way of exemplification since changes may be made in minor details, and equivalent mechanical expedients resorted to, with like results, and without departing from the spirit and intent of my invention in this respect.

With this understanding:—

Fig. 1, represents a side elevation of the fore part of an automobile provided with my protective tire means, the latter being hereinafter designated as the tire protector;

Fig. 2, is a sectional elevation, on a larger scale, of the tire protector and adjacent parts shown in Fig. 1;

Fig. 3, is a view like unto Fig. 2, showing the tire protector adjusted out of contact with the tire tread;

Fig. 4, is a view of the under side of the tire protector;

Fig. 5, is a transverse sectional elevation taken upon plane of line 5—5, Fig. 4;

Fig. 6, is a longitudinal sectional elevation taken upon plane of line 6—6, Fig. 4;

Fig. 7, is a perspective view of the main portion of the tire protector detached from its support;

Fig. 8, is a sectional elevation taken upon plane of line 8—8, Fig. 7;

Fig. 9, is a detail view, upon a larger scale, of the forward or brush end of the tire protector.

What may be designated as the bracket plate B, of my device, is preferably made of elastic resilient metal, such as spring steel, the shank portion $b$, being formed with a longitudinal slot $b'$, to enable said shank $b$, to straddle and accommodate the screw bolt $a$, by means of which said bracket plate B, is adjustably secured to a clamp-sleeve C, which is rigidly attached to the under side of a mud guard G, so called, by means of screw bolts $c$, and nuts $c'$, as will be understood by reference more particularly to Figs. 4, 5 and 6, of the drawings.

The clamp-sleeve C, is made in two parts consisting of a base plate $c^2$, and a channel plate $c^3$, the latter being formed with parallel longitudinal side shoulders $c^x$, $c^x$, which confine and sustain the side edges of the shank $b$, of the bracket plate B, as shown in Fig. 5, while admitting of the sliding of said shank $b$, within the clamp-sleeve C, considering the latter in a unitary sense.

The clamping bolt $a$, extends not only through the slot $b'$, in the shank portion $b$, of the bracket plate B, but also through a perforation formed for the purpose in the channel plate $c^3$, and is provided with a thumb nut $a'$, by means of which the bracket plate B, may be tightened or loosened as related to the channel plate $c^3$.

The inner bifurcated ends of the shank portion $b$, of the bracket plate B, after the insertion thereof into the clamp-sleeve C, are bent over to form retaining shoulders $b^2$, $b^2$, which thus prevent the detachment of the bracket plate B, from the clamp-sleeve C, after incorporation therewith. Furthermore, these retaining shoulders $b^2$, $b^2$, function as stops to limit the forward adjustment and extension of said bracket plate, as indicated in Figs. 2, 4 and 6, of the drawings.

The forward portion $b^3$, of the bracket plate B, is bent downward as related to the shank portion $b$, thereof, and terminates in a concave edge $b^4$, which functions as a scraper when in contact with the peripheral surface of the tire tread T, as in Figs. 1 and 2, thus insuring the prompt removal of tacks, nails, fragments of glass, or other dangerous objects taken up by the tire during its contact with the road bed traversed; and it is to be noted in this connection that this result is attained in less than a half revolution of the wheel thus protected, since my tire protector is located on the under side of the mud guard G, at the rear of and below the top of the tire tread, rotatively considered.

In order to increase the elastic resilience of the bracket plate B, medially, it is bent between the shank portion $b$, and the forward portion $b^3$, to form an intervening S-shaped section $b^x$, which lessens the rigidity of the plate B, and adapts it to yield more readily under undue pressure, and also to compensate for fluctuations of tire tread surface incidental to traction irregularities.

Rigidly attached to the forward portion $b^3$, of the bracket plate B, is an extension arm $e$, on the outer extremity of which is mounted a brush $e'$, also for contactual engagement with the peripheral surface of the tire tread T, as indicated in Figs. 1, 2, and 9, of the drawings. The brush $e$, sweeps off any extraneous matter not removed by the scraper $b^4$, such for instance, as burs of the puncture vine, and analogous plant products, grit, and adhesive matter generally, insuring a clean, smooth peripheral tread surface.

The contact of both the scraper $b^4$, and of the brush $e'$, with the peripheral surface of the tire tread T, is regulated and limited by means of a bearing roller R, positioned between them, and swivel-mounted on the extension arm $e$, so as to enable it to adapt itself to the lateral variation of the wheel in turning or traversing curves. This may be accomplished as shown in the drawings, and particularly in Fig. 8, thereof, by journaling said bearing roller R, on and between the bifurcated end $r$, of a spindle $r'$, the upper portion of which is rotatively attached to the extension arm $e$, by means of collars $r^2$, $r^3$, keyed to the spindle $r'$, and contacting with opposite sides of the said extension arm $e$, thereby prescribing the position of the spindle $r'$, while allowing it to turn on its axis, so that the roller R, is free to roam over the peripheral surface of the tire according to requirements as above intimated, thus obviating frictional resistance and maintaining an operative relationship of the component parts of the device.

When not desired for immediate use my tire protector may be supported out of contact with the tread T, by securing the bracket plate, etc. in retracted position as shown in Fig. 3, of the drawings.

The S-shaped portion $b^x$, of the bracket plate is essentially a transverse corrugation thereof.

What I claim as my invention and desire to secure by Letters Patent, is:—

1. Pneumatic tire protective means of the character designated, comprising an elastic bracket plate attached to the under side of a mud guard and formed with a scraper, and with a brush and also with a bearing roller for contact with the opposed peripheral surface of a tire tread, said bearing roller being swivel mounted on said bracket plate, substantially in the manner and for the purpose set forth.

2. Pneumatic tire protective means of the character designated, comprising a clamp-sleeve secured to the under side of a mud guard and a bracket plate adjustably mounted on said clamp-sleeve and formed with a scraper, brush and bearing roller for contact with the opposed peripheral surface of a tire tread, substantially in the manner and for the purpose set forth.

3. Pneumatic tire protective means of the character designated, comprising a clamp-sleeve secured to the under side of a mud guard and a bracket plate adjustably mounted on said clamp-sleeve and formed with a scraper and brush for contact with the opposed peripheral surface of a tire tread, substantially in the manner and for the purpose set forth.

4. Pneumatic tire protective means of the character designated, comprising a clamp-sleeve secured to the under side of a mud guard, and a transversely corrugated elastic resilient bracket plate adjustably mounted on said clamp-sleeve and formed with a scraper and brush for contact with the opposed peripheral surface of a tire tread, substantially in the manner and for the purpose set forth.

ALEXANDER J. LA PIERRE.